Sept. 13, 1932.  E. SNYDER  1,877,484
MACHINERY FOR SEALING ELECTRICAL COILS
Filed Oct. 1, 1929  6 Sheets-Sheet 1
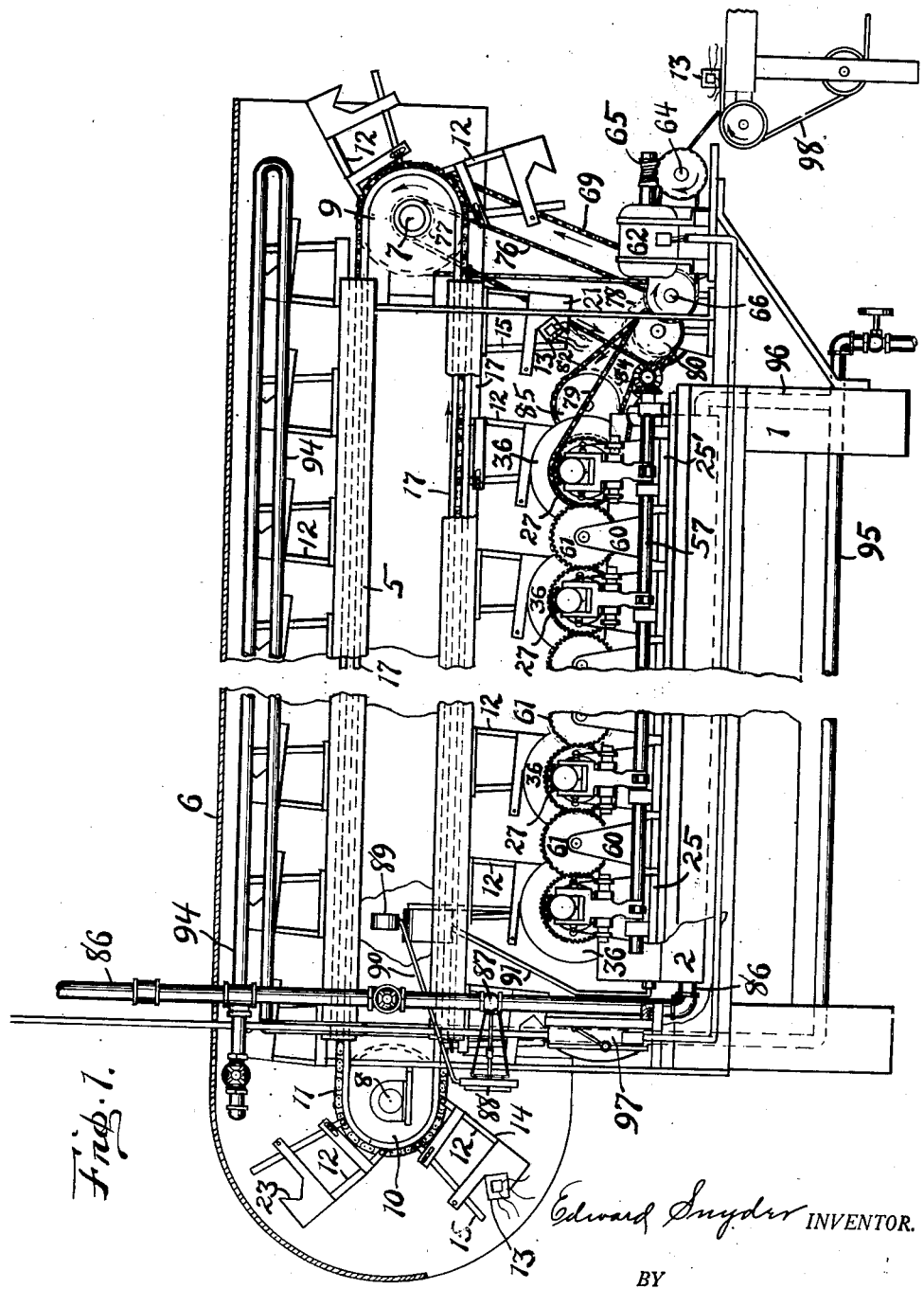

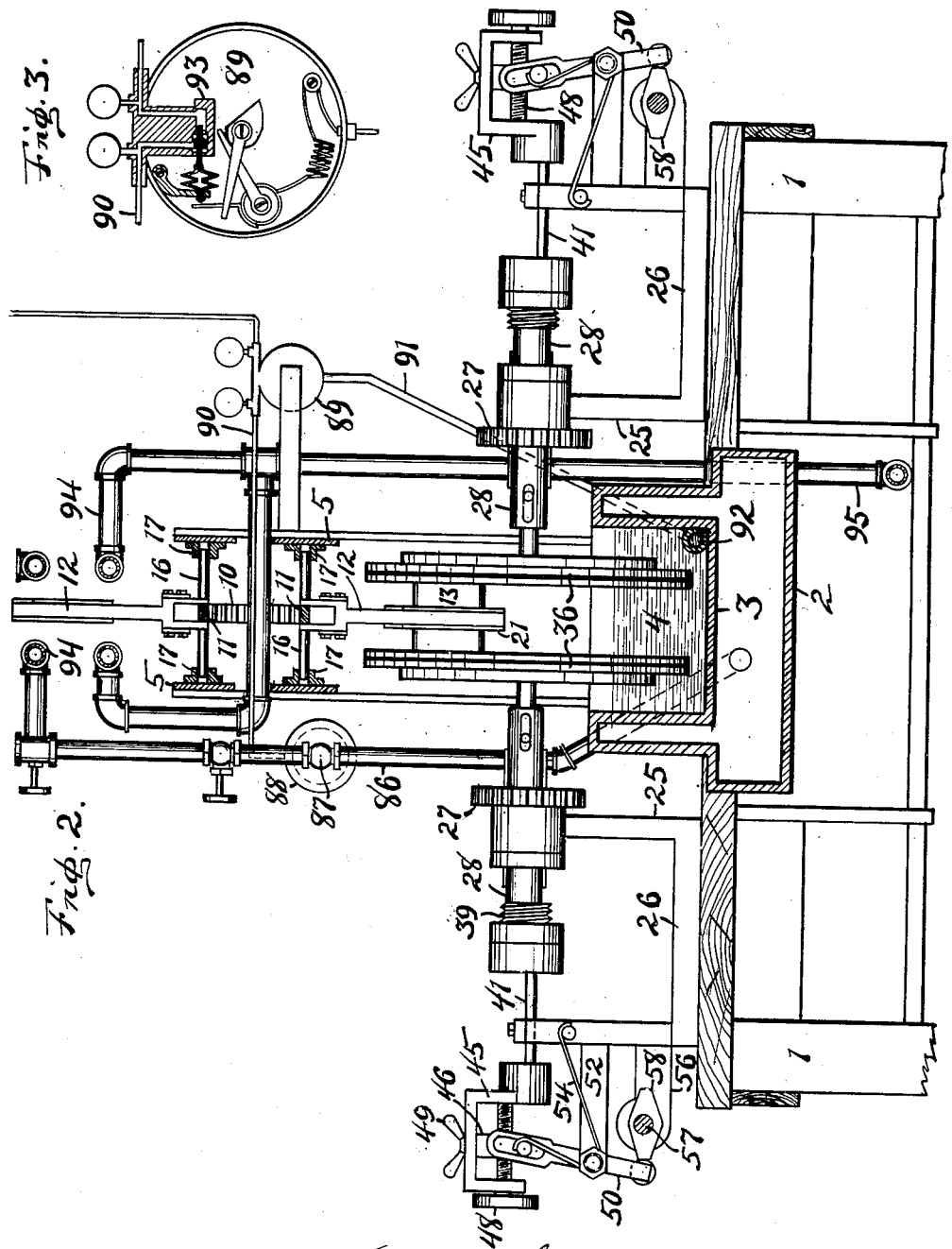

Sept. 13, 1932.  E. SNYDER  1,877,484
MACHINERY FOR SEALING ELECTRICAL COILS
Filed Oct. 1, 1929  6 Sheets-Sheet 3
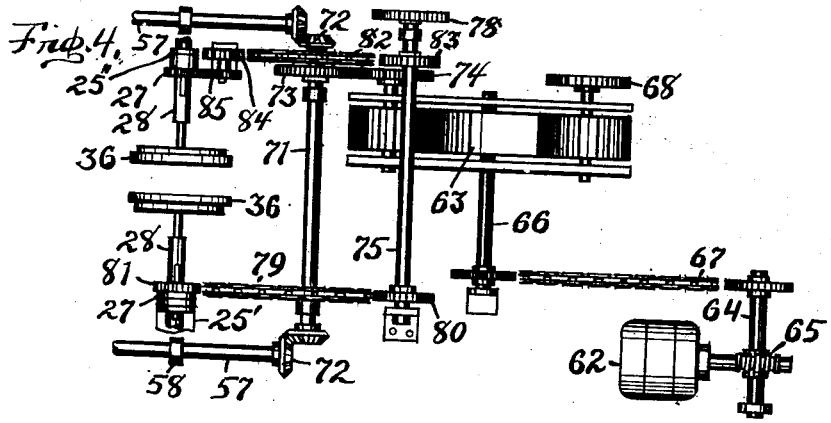
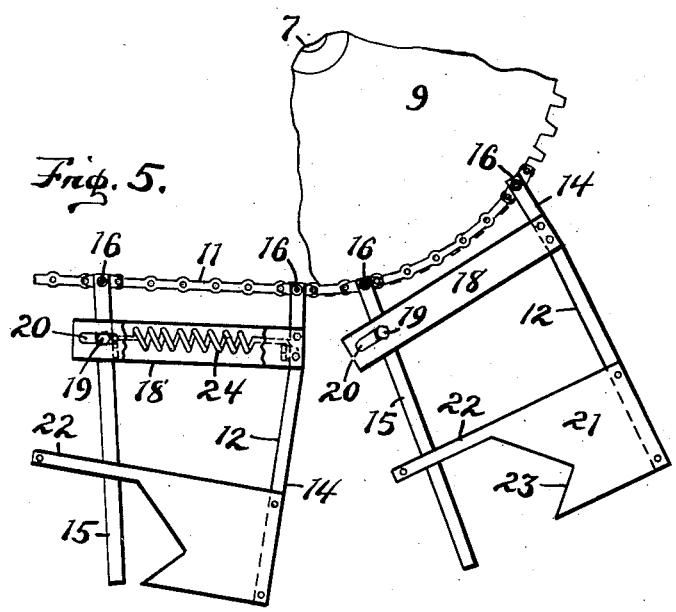
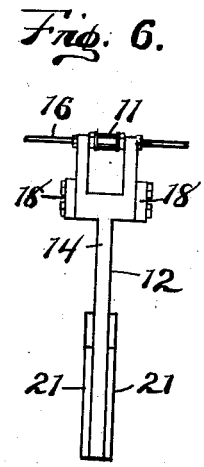
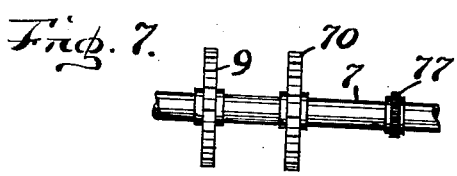
Edward Snyder
INVENTOR
BY
A. G. Burns ATTORNEY

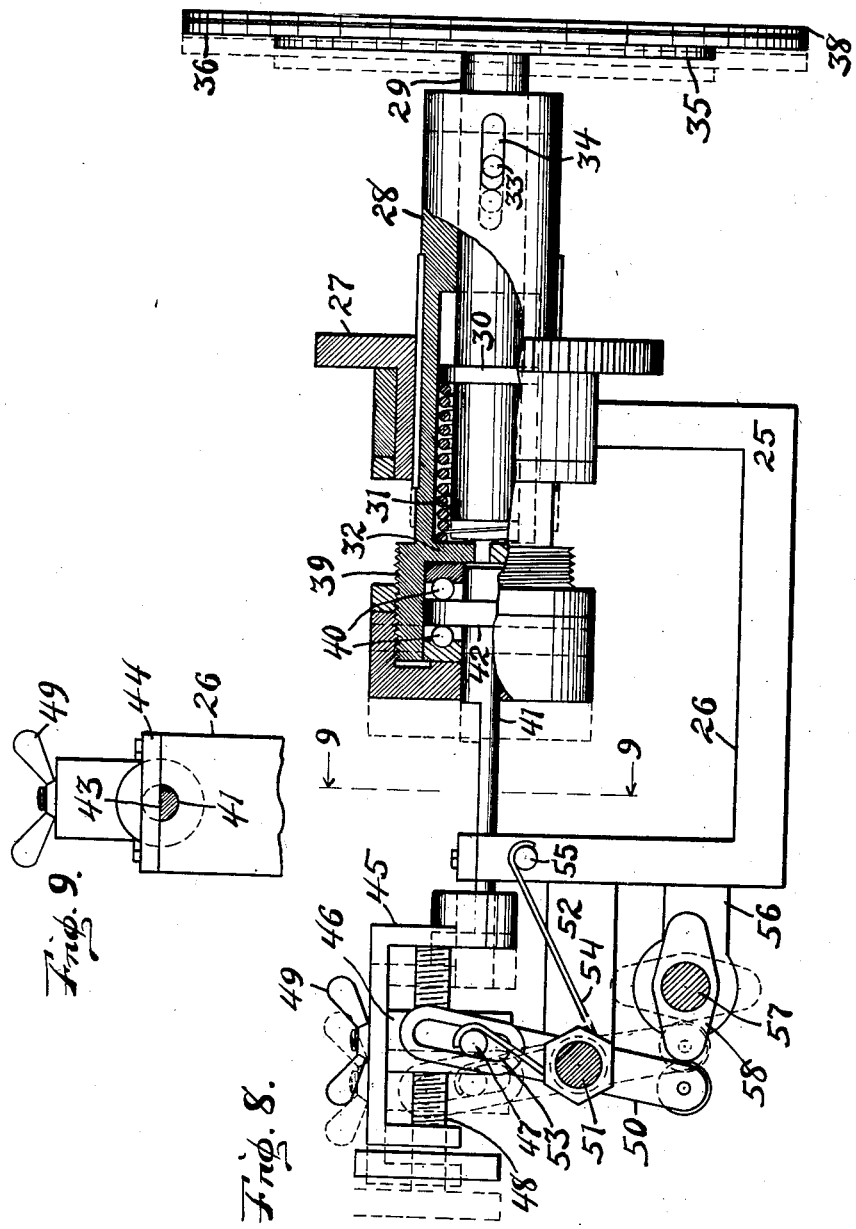

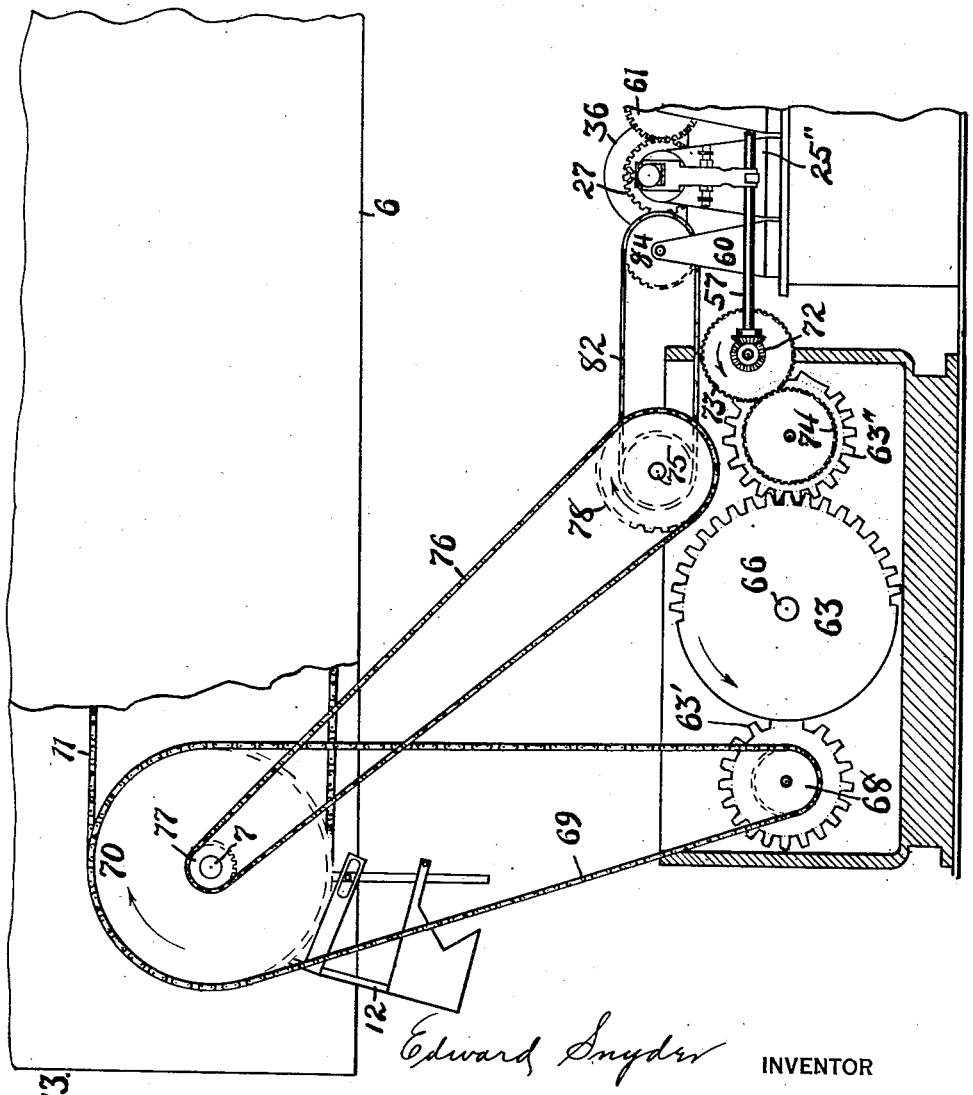

Patented Sept. 13, 1932

1,877,484

UNITED STATES PATENT OFFICE

EDWARD SNYDER, OF FORT WAYNE, INDIANA, ASSIGNOR TO GENERAL CABLE CORPORATION, OF NEW YORK, N. Y., A CORPORATION OF NEW JERSEY

MACHINERY FOR SEALING ELECTRICAL COILS

Application filed October 1, 1929. Serial No. 396,589.

This invention relates to improvements in machinery for sealing electrical coils during the manufacture thereof, and it has particular relation to sealing means for coils formed of numerous layers of fine wire interposed between strips of paper.

It is an object of this invention to provide improved means for applying wax, or a similar substance, to the ends of such coils, so that the spaces between the paper strips adjacent the ends of the layers of wire in the coil may be filled with a sealing agent and the coil structure thereby protected.

Other objects and advantages of the invention will appear hereinafter.

An embodiment of the invention selected for purposes of illustration is shown in the accompanying drawings, in which:—

Fig. 1 is a side elevation of a machine embodying the invention, portions thereof being broken away;

Fig. 2 is a transverse section of the machine substantially through the middle portion of Fig. 1;

Fig. 3 is a detail view of a thermostatically operated pneumatic device for controlling the heating means by which the sealing agent is maintained in a fluid state;

Fig. 4 is a top plan view of a part of the gearing and the motor connected therewith by which the machine is actuated;

Fig. 5 is an enlarged fragmentary detail view of the coil conveying apparatus;

Fig. 6 is an end elevation of one of the claspers on the conveyer shown in Fig. 5;

Fig. 7 is a detail view of the drive-shaft and the wheels thereon that form part of the conveyer mechanism;

Fig. 8 is an enlarged detail view of one of the sealing agent applicators shown in Fig. 2, with certain parts thereof broken away;

Fig. 9 is a transverse sectional view taken on the line 9—9 of Fig. 8;

Fig. 13 is a detail elevation, partly broken away, of an intermittent gearing and the associated coil-conveying apparatus and sealing agent applicators.

Figure 10:
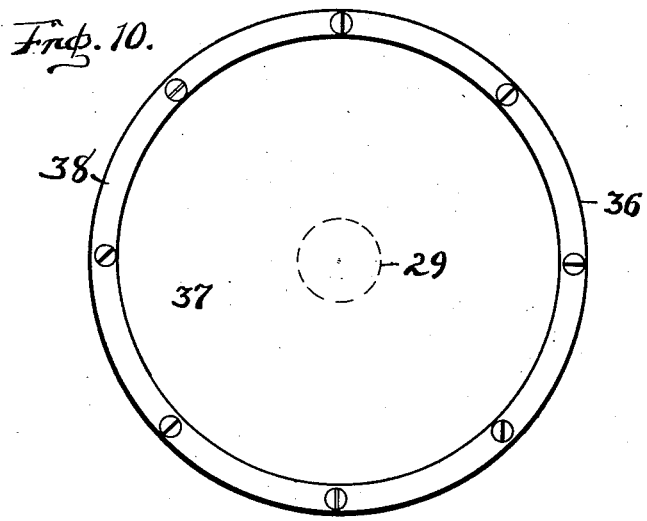
Fig. 10 is a front elevation of the tamp-plate of one of the applicators.
Figure 11:
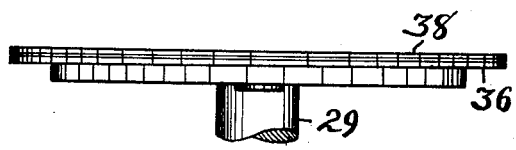
Fig. 11 is a plan view of the tamp-plate shown in Fig. 10.
Figure 12:
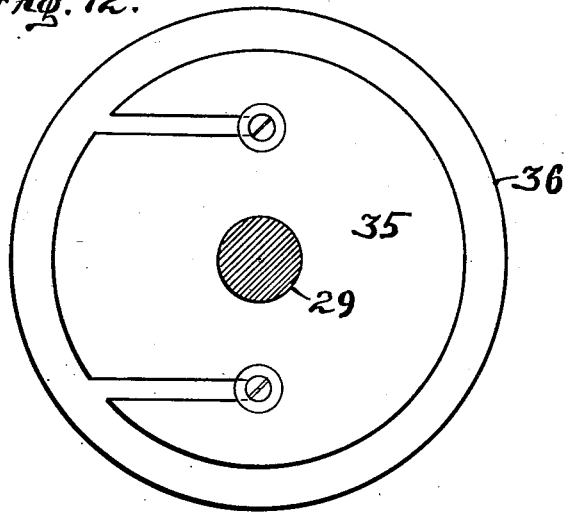
Fig. 12 is a rear elevation of the tamp-plate and its support.

The machine shown in the drawings has a base which is formed by a pair of benches 1 placed side-by-side and spaced apart. Between the benches 1, and supported thereby, is a steam-box 2 into the top of which depends a trough 3 containing a quantity of wax or other sealing agent 4. Above the base is supported a frame 5, the upper part of which is partially enclosed by a hood 6. A drive-shaft 7 is mounted in one end of the frame transversely of the length thereof, and a countershaft 8 is similarly journaled at the opposite end of the frame. The drive-shaft 7 has fixed thereon a sprocket-wheel 9 and the countershaft 8 has a similar sprocket-wheel 10 which is operatively alined with the sprocket-wheel 9. A link-belt 11 is mounted on the sprocket-wheels 9 and 10 and it carries a series of claspers 12, which belt and claspers constitute a conveyor by means of which the electrical coils 13 to be sealed may be passed through the machine.

Referring to Figs. 1, 5 and 6, the conveyer claspers each consist of a pair of arms 14 and 15 which are respectively pivoted on the belt 11 at spaced points by means of rods or pins 16. The ends of each rod 16 project laterally from the belt 11 and extend into corresponding guideways 17 in which they are free to slide as the belt moves due to rotation of the sprocket-wheel 9. The engagement of the pins 16 in the guideways 17 prevents sagging of those portions of the belt 11 extending between the sprocket wheels 9 and 10, thereby substantially obviating vertical play of the claspers 12.

Each clasper is provided with a fetter which may comprise a pair of parallel bars 18 between and to adjacent ends of which the arm 14 is secured at a point spaced from its pivoted end. The arm 15 extends loosely between the free ends of the bars 18, and is provided with a stud 19 that projects through elongated, longitudinally disposed slots 20 in the bars 18, thereby permitting a limited swinging movement of the arm 15 relative to the arm 14.

The arm 14 has secured on opposite sides of its outer end a pair of notched plates 21 which project toward the arm 15, and which have extensions 22 between which the arm 15 is freely movable. The notched faces 23 of the plates 21 are shaped so as to straddle and engage the sides of an electrical coil 13, (Fig. 1) when placed therein. A contracting spring 24 connects the arms 14 and 15, and normally tends to draw the arms toward each other, whereby a coil may be clamped and held between the end of the arm 15 and the notched faces 23 of the plates 21.

As the belt 11 moves around the sprocket-wheels 9 and 10, the direct distance between the pivots 16 of each clasper is decreased due to the curvature of the belt 11. As a result, the pivoted ends of the arms 14 and 15 are drawn toward each other, causing a pivotal movement of the arm 15 about the stud 19 away from the notched faces 23 of the plates 21.

Thus as each clasper passes around the sprocket-wheel 10, its arms are automatically spread apart to open position which permits manual insertion of a coil in the clasper. As the belt 11 passes from under the sprocket-wheel 10 and resumes a straight course, the distance between the pivoted ends of the arms 14 and 15 of the corresponding clasper is thereby increased, causing the arm 15 to turn about the stud 19, so that its outer end is moved into engagement with the inserted coil 13. In this manner the coils 13 are automatically secured in the claspers after manual insertion therein and are held in such secured position until automatically released, which action occurs in similar manner as the claspers travel around the sprocket-wheel 9.

As shown particularly in Figs. 2 and 8, a series of applicators 25 is mounted on each bench. Each of the applicators 25 conveniently comprises a frame 26 having rotatably mounted in one end a gear 27, and in said gear is mounted a sleeve 28 which is splined thereto and which is longitudinally movable therein. In said sleeve 28 is mounted a longitudinally movable shaft 29 having a collar 30. A compression spring 31 is positioned within the sleeve 28 between the collar 30 and an internal flange 32 in the sleeve 28, which spring tends to hold the shaft 29 in its outermost position. A pin 33 in the shaft 29 extends through an elongated slot 34 in the sleeve 28, so that longitudinal movement of the shaft 29 in the sleeve 28 is limited.

One end of the shaft 29 projects from the end of the sleeve 28 and has mounted thereon a head 35 upon which is removably secured a tamp-plate 36. The front of the tamp-plate 36 is provided with a facing 37, (Fig. 10) of fabric or other suitable material which is secured thereto by means of a marginal ring 38.

Referring to Figs. 8 and 9, upon the rear end of the sleeve 28 is provided a housing 39 containing a pair of annular ball bearings 40. A shaft 41 extends into the housing and has an annular shoulder 42 thereon that is disposed between the bearings 40. The shaft 41 is mounted in the frame 26 and is longitudinally movable. A portion of the top of the shaft 41 has a flat face 43 over which extends a bar 44. The bar 44 is secured to the frame 26, so that rotation of the shaft 41 is prevented. A bracket 45 is mounted on the outer end of the shaft 41, and the bracket is provided with an adjustable block 46 having a laterally projecting pin 47. Adjustment of the block 46 longitudinally with respect to the bracket and the shaft 41 may be affected by means of a screw 48. A bolt and wing-nut 49 serve to secure the block 46 in adjusted positions within the bracket 45.

A rocker-arm 50 is mounted upon a shaft 51 that is supported upon a projection 52 from the frame 26, and the pin 47 on the block 46 extends through an elongated slot 53 in the rocker-arm, so that when the rocker-arm 50 is oscillated upon its bearing-shaft 51, longitudinal vibratory movement is imparted to the shaft 41 and the sleeve 28 connected therewith. A spring 54 is mounted on the shaft 51, one arm of the spring bearing against the pin 47, while the opposite end engages a pin 55 on the frame 26, whereby the shaft 41 normally is urged outwardly, or, in Fig. 8, to the left.

Upon the outer end of each frame 26 is mounted an outwardly extending bracket 56 in which is supported a cam-shaft 57 that extends also through the corresponding brackets of the other applicators of the same series. A series of cams 58 is rigidly secured to the shaft 57. These cams engage respectively with the rocker-arms 50 of the applicators, whereby said rocker-arms are moved in opposition to the action of their respective springs 54 when said cam-shaft 57 is revolved.

The applicators 25 are positioned upon the benches 1 so that their tamp-plates 36 overhang the trough 3 and their lower portions are submerged in the sealing liquid therein. Also, the applicators 25 of one series are respectively disposed in alinement with those of the other series so as to form a series of opposed pairs between which the claspers 12 pass upon the operation of the conveyer. Referring to Fig. 1, a series of standards 60 are arranged on each table, the standards being located respectively between the applicators of the table. In each of the standards 60 is mounted an intermediate gear 61 that meshes with the gears 27 on the applicators adjacent thereto, so that the gears 27 on the applicators of each series have corresponding rotary movement.

As illustrated in Figs. 4 and 13, motive power is transmitted to the conveyer and to the applicators 25 through transmission mechanism from any suitable source of power, such as a motor 62, said mechanism conveniently comprising a train of gears 63, 63' and 63''. The motor 62 is operatively associated with a shaft 64 by means of worm-and-wheel mechanism 65, and the shaft 64 actuates a drive-shaft 66 for the gear 63 through the chain and sprocket-wheel mechanism 67.

A sprocket-wheel 68, which is mounted so as to be actuated by the gear 63', is connected by a link belt 69 with a sprocket-wheel 70, (Fig. 7) on the drive-shaft 7 of the conveyer, whereby movement is imparted from the motor 62 to the conveyer.

The cam-shafts 57 receive movement from the gear 63'' through a countershaft 71 that is operatively associated with said cam-shafts through corresponding pairs of bevel gears 72 and with said gear train through spur gears 73 and 74.

Power is imparted to the gear 27 on the end applicator of each series from a countershaft 75. The countershaft 75 is actuated from the drive-shaft 7 through a link belt 76 which operatively connects a sprocket-wheel 77 on said drive-shaft 7 and a sprocket-wheel 78 on said countershaft 75. One of the series of applicators is actuated by said countershaft 75, (Figs. 4 and 13) through a link belt 79 which extends between a sprocket-wheel 80 mounted on the countershaft 75, and a sprocket-wheel 81 mounted on one side of the gear 27 of the applicator 25' and in axial alignment therewith. The other series of applicators is actuated by the countershaft 75 through a link belt 82 which extends between a sprocket-wheel 83 mounted on the countershaft 75 and a sprocket-wheel 84 from which movement is imparted to the gear 27 on the applicator 25'' through a gear 85 connected therewith.

The transmission mechanism composed of the gears 63, 63' and 63'', (Fig. 13) preferably is of the interrupted motion type, the teeth of the gears being so grouped that the gears 63' and 63'' are actuated alternately by the driving gear 63. Thus, the vibratory action of the applicators, controlled through the gear 63'', occurs periodically, and movement of the conveyer and the rotary action of the applicators, controlled through the gear 63', occur concurrently during periods intervening the periodic vibratory operations of the applicators.

The gears 63 and 63' and the driving means operatively associating them with the conveyer are such that upon each periodic operation of the gear 63', the conveyer is progressed to the extent that the coils 13, held in the claspers 12, are advanced from between one pair of applicators to position between the next succeeding pair, where they are held stationary during the vibratory action of the applicators.

The gearing 72, 73 and 74 operatively associating the applicators with the gear 63'', through which the applicators receive their vibratory action, is so set that during the intermissions between their vibratory periods, the tamp-plates 36 occupy a position out of contact with the coils 13. Thus, during the period of movement of the conveyer, the coils 13 are advanced and the tamp-plates are revolved without interference so as to become coated with the sealing agent.

As a means of heating the body of wax 4 in the trough and to maintain it in a proper state of fluidity, steam may be supplied to the box 2 through a pipe 86 having a valve 87, (Figs. 1 and 2). The valve 87 conveniently is actuated by means of a pneumatically operated regulator 88 controlled by a thermostat 89.

The regulator and thermostat may be of any suitable type. Conveniently, the regulator 88 is supplied through a pipe 90 with air under pressure from a suitable source of supply, (not shown). The regulator is so designed that when air under pressure is applied thereto through the pipe 90, the valve 87 is closed, so that the supply of steam to the box 2 is reduced or shut off entirely.

The thermostat 89 has a pipe connection 91 with a tube 92 that is disposed in the lower part of the trough 3 and extends throughout the length thereof. Within the tube 92 is contained an expanding agent in the form of a fluid convertible into a gaseous state at the temperature at which the wax reaches the desired condition of fluidity, whereby a fluid pressure may be established in the pipe 91 sufficient to actuate the thermostat 89. As shown in Fig. 3, the thermostat 89 is operatively associated with a valve 93 which controls the passage of air through the pipe 90 leading to the regulator 88.

The valve 93, the thermostat 89, and the expanding agent control the admission of air to the regulator 88 so that when the temperature of the wax in the trough rises to a predetermined maximum point air is supplied to the regulator 88. The supply of air, however, is interrupted when the temperature of the wax drops to a predetermined point. Thus, when the temperature of the wax is raised to a predetermined maximum point by the steam admitted to the box 2, the valve 87 is automatically closed, so that the supply of steam to said box is shut off, but the valve 87 is automatically opened when the temperature of the wax drops, thereupon admitting additional steam to the box.

The conveyer is maintained at a sufficiently high temperature to obviate premature chilling of the wax in the trough as it is applied to the coils, as by means of a steam coil formed of pipes 94 connected with the steam-supply pipe 86. The steam coil is disposed within the hood 6 in juxtaposition with the upper part of the conveyer, the claspers 12 of which become heated by radiation while passing the steam coil. Connected with the steam coil is a drain-pipe 95, and with the steam box 2 an outlet pipe 96, through which condensed matter is discharged.

In the operation of the invention, the motor 62 is energized by closing a switch 97, whereupon, the conveyer is periodically actuated, so that the claspers 12 are moved in succession between the tamp-plates 36 of the two series of applicators. As the claspers 12 pass around the sprocket-wheel 10, they open, as shown in Fig. 5, permitting the coils 13 to be manually inserted therein. After insertion into a clasper, the coil is held therein by the arm 15 which automatically is moved into its closed position as the clasper 12 is moved by the belt into a straight course.

The coils thus held are advanced by stages between the several opposite pairs of tamp-plates 36 in succession, and the tamp-plates become coated with the fluid wax as they rotate partially submerged therein, said wax being subsequently transferred forcibly from the tamp-plates to the adjacent ends of the coils as said tamp-plates, during their vibratory movement, have contact therewith. The cams 58 are so arranged upon their cam-shafts that each opposite pair of tamp-plates are timed in their reciprocal movement and move toward and from each other, so that opposite tamp-plates have contact respectively with the opposite ends of the coils held therebetween, simultaneously.

The force of the impact of the tamp-plates upon the coils is partially absorbed by the springs 31 which permit restrained longitudinal movement of the shafts 29 upon which the tamp-plates are mounted. By turning the adjusting screws 48 in one direction or the other, the normal spacing between the opposite tamp-plates may be increased or decreased accordingly as may be required to accommodate coils of different lengths, said adjustment also having the effect of varying the pressure of the tamp-plates against the coils. As the claspers pass around the sprocket-wheel 9, they automatically open, thereby releasing the coils from the claspers. A belt conveyer 98, (Fig. 1) of any suitable construction may be disposed at the discharge end of the machine, to receive the coils as they are dropped from the claspers and convey them from the machine. Hence, during the passage of the coils through the machine, their ends become packed with the wax which is imparted thereto by repeated applications, and are thereby sealed.

While only one embodiment of the invention has been shown and described, it will be understood that the invention may be variously modified and embodied within the scope of the claims.

Claims:—
1. In a coil sealing machine, the combination of a trough containing a sealing agent; two series of applicators disposed upon opposite sides of said trough, each applicator comprising a tamp-plate that intermittently rotates and reciprocates longitudinally with respect to its axis, and is partially submerged in said agent; a conveyer including a series of coil-holding claspers constructed and arranged so as to progress coils, inserted therein, between opposed tamp-plates of the two series of applicators, whereby said sealing agent is applied to the ends of said coils through contact between the coils and the tamp-plates; means for heating the trough and said conveyer; and mechanism for actuating said applicators and conveyer.

2. In a coil sealing machine, the combination of a trough containing a sealing agent; heating means for maintaining said agent in a liquid state; two series of applicators disposed upon opposite sides of said trough, each applicator comprising a tamp-plate that rotates and reciprocates longitudinally upon its axis and is partially submerged in said agent; and means for holding coils and progressing them between opposed tamp-plates, whereby the tamp-plates have intermittent contact with the ends of said coils to apply the sealing agent thereto and seal the ends of the coils.

3. In a coil sealing machine, the combination of a trough containing a fluid sealing agent; two series of applicators disposed upon opposite sides of said trough, each applicator comprising a tamp-plate that rotates and reciprocates longitudinally upon its axis and is partially submerged in said agent; and means for holding coils and progressing them step-by-step between opposed tamp-plates of the two series of applicators, whereby said tamp-plates have intermittent contact with and force sealing agent into the ends of said coils.

4. In a coil sealing machine, the combination of a trough containing a fluid sealing agent; applicators arranged in opposed pairs, each comprising a tamp-plate that rotates, and reciprocates longitudinally upon its axis oppositely with respect to the corresponding opposed tamp-plate, and is partially submerged in said agent; a conveyor for holding and progressing coils between the opposed tamp-plates, whereby opposed tamp-plates simultaneously contact with the corresponding ends of said coils and apply sealing agent thereto; and means for actuating said applicators and conveyer.

5. In a coil sealing machine, the combination of a trough containing a fluid sealing agent; applicators arranged in opposed pairs, each comprising a tamp-plate that rotates, and reciprocates longitudinally upon its axis oppositely with respect to the corresponding opposed tamp-plate, and is partially submerged in said sealing agent; and a conveyer for holding and progressing coils between the opposed tamp-plates, whereby opposed tamp-plates may simultaneously contact with the corresponding ends of a coil and apply sealing agent thereto.

6. In a coil sealing machine, the combination of two applicators oppositely disposed and spaced apart, each applicator comprising a tamp-plate; means for supplying a sealing agent to said tamp-plates; a conveyer for holding and progressing coils through between said tamp-plates; and mechanism adapted to actuate said tamp-plates to cause repeated simultaneous contact between said tamp-plates and the ends of said coils, whereby said sealing agent is transferred from said tamp-plates to said coils to seal the ends thereof.

7. In a coil sealing machine, the combination of an applicator for applying a liquid sealing agent to coils; comprising a shaft mounted to have a limited longitudinal freedom of movement; a tamp-plate on one end of the shaft; means for applying a sealing agent to the face of said tamp-plate; means for holding and progressing coils adjacent the face of said tamp-plate; and mechanism connected with said shaft for imparting longitudinal reciprocating movements to said tamp-plate, whereby the tamp-plate repeatedly contacts with the end of a coil to transfer said sealing agent to the coil.

8. In a coil sealing machine, an applicator for applying a liquid sealing agent to coils, comprising, in combination, a revolubly mounted shaft; a tamp-plate on one end of the shaft; means for imparting longitudinal reciprocating movement to said shaft, whereby the tamp-plate may be forced against the end of a coil; and resilient means connecting and permitting relative movement between said tamp-plate and said shaft.

9. In a coil sealing machine, the combination of an applicator, comprising a tamp-plate supported so as to revolve and also reciprocate longitudinally upon its axis; means for coating the face of said tamp-plate with a sealing agent; means for holding and progressing coils adjacent the face of the tamp-plate; and mechanism for actuating said holding means and for imparting rotary and reciprocal movements to said tamp-plate, whereby the tamp-plate contacts with the coil, and said sealing agent is forced into the coil.

10. In a coil sealing machine, the combination of an applicator, comprising a tamp-plate supported so as to reciprocate longitudinally and revolve upon its axis, the face of which tamp-plate is coated with a liquid sealing agent; means for holding and progressing coils so as to have contact with the face of said tamp-plate to receive said sealing agent; and means for actuating said tamp-plate.

11. Means for applying a liquid sealing agent to the ends of coils, comprising, in combination, a pair of oppositely disposed, spaced tamp-plates supported so as to revolve and also to reciprocate longitudinally upon their axes, the faces of which tamp-plates are coated with a liquid sealing agent; means for holding and progressing coils between said tamp-plates so that the ends of said coils contact with the corresponding tamp-plates simultaneously upon reciprocation of the tamp-plates, and receive said sealing agent; and means for actuating said holding means and tamp-plates.

12. Means for applying a liquid sealing agent to the ends of coils, comprising, in combination, opposed rotating tamp-plates spaced apart and having opposite reciprocating movements toward and from each other, the opposed faces of which tamp-plates are coated with a liquid sealing agent; and mechanism for passing coils between said tamp-plates to receive the sealing agent therefrom by having contact therewith.

13. In means for sealing the ends of coils, the combination of means for holding and conveying said coils; and opposed vibrating tamp-plates, the faces of which are coated with a sealing fluid, said tamp-plates being disposed so as to contact with the ends of corresponding coils simultaneously as the coils are positioned therebetween, whereby said fluid is imparted to the coil ends.

14. In means for sealing coils, the combination of opposed vibrating tamp-plates arranged to receive a coating of sealing fluid; a coil conveyer for conveying coils through between the opposed tamp-plates; and means for moving said tamp-plates toward each other when a coil is therebetween, whereby the tamp-plates are pressed repeatedly and simultaneously against the ends of the coil to force sealing fluid into the coil ends.

15. In means for sealing coils, the combination of a trough containing a sealing fluid; vibrating tamp-plates receiving a coating of fluid from said trough; a conveyer so disposed that the coils conveyed thereby have contact with the tamp-plates and receive said fluid therefrom; and means for heating said conveyer and trough.

16. In means for sealing coils, the combination of a heated trough adapted to contain a sealing fluid; tamp-plates that have axial vibrating and rotating movements adapted to receive a coating of fluid from said trough; and a conveyer so disposed that coils conveyed thereby have contact with said tamp-plates and receive said fluid therefrom.

17. In means for sealing coils, the combination of tamp-plates coated with a sealing fluid that have axial vibrating and rotating movements; and a conveyer so disposed that the coils conveyed thereby have contact with the tamp-plates and receive said fluid therefrom.

18. In apparatus of the class described, the combination of a conveyer comprising a traveling belt, spaced wheels for supporting said belt, and a series of coil claspers, each of which has spaced arms pivoted to the belt and provided with a fetter, a spring for contracting said arms, and notched plates on one of said arms, between which plates and the other arm a coil may be removably held, said other arm being operatively associated with said fetter whereby said arms become spread to open position during passage around said wheels, and to closed position during passage in the straight course from one wheel to the other; and means for applying a sealing fluid to coils while held and conveyed in said claspers by having contact with said coils.

19. In apparatus of the class described, the combination of a conveyer comprising a traveling belt provided with a series of claspers attached thereto, wheels spaced apart supporting said belt, each of said claspers having two connected relatively movable members pivotally secured to said belt respectively at points thereon spaced apart whereby said claspers are automatically opened upon passing around said wheels, and are closed during their passage in the straight course from one wheel to the other; and means for applying a sealing fluid to coils while held and conveyed in said claspers.

20. Apparatus for sealing the ends of coils, comprising, in combination, applicators having oppositely disposed spaced tamp-plates that alternately vibrate and rotate; a trough containing a liquid sealing agent in which said tamp-plates are partially submerged; a conveyer for holding and passing coils between the tamp-plates; and driving mechanism associated with the applicators and the conveyer whereby said conveyer has movement only during rotation of said tamp-plates and is stationary during vibration thereof, said coils having contact with said tamp-plates only during vibration thereof.

21. Apparatus for applying a liquid sealing agent to the ends of electrical coils, comprising, in combination, a vibratory tamp-plate coated with a sealing agent; a conveyer for holding and passing coils to and from a point adjacent said tamp-plate; and means for alternately actuating said tamp-plate and the conveyer, whereby said tamp-plate contacts with said coils only when the conveyer is stationary.

In testimony whereof I affix my signature.
EDWARD SNYDER.